INVENTOR.
Edward A. Field Jr.
BY
Otis A. Earl
Attorney.

Jan. 8, 1952 E. A. FIELD, JR 2,581,757
DRAFT CONTROL
Filed July 28, 1949 3 Sheets-Sheet 2
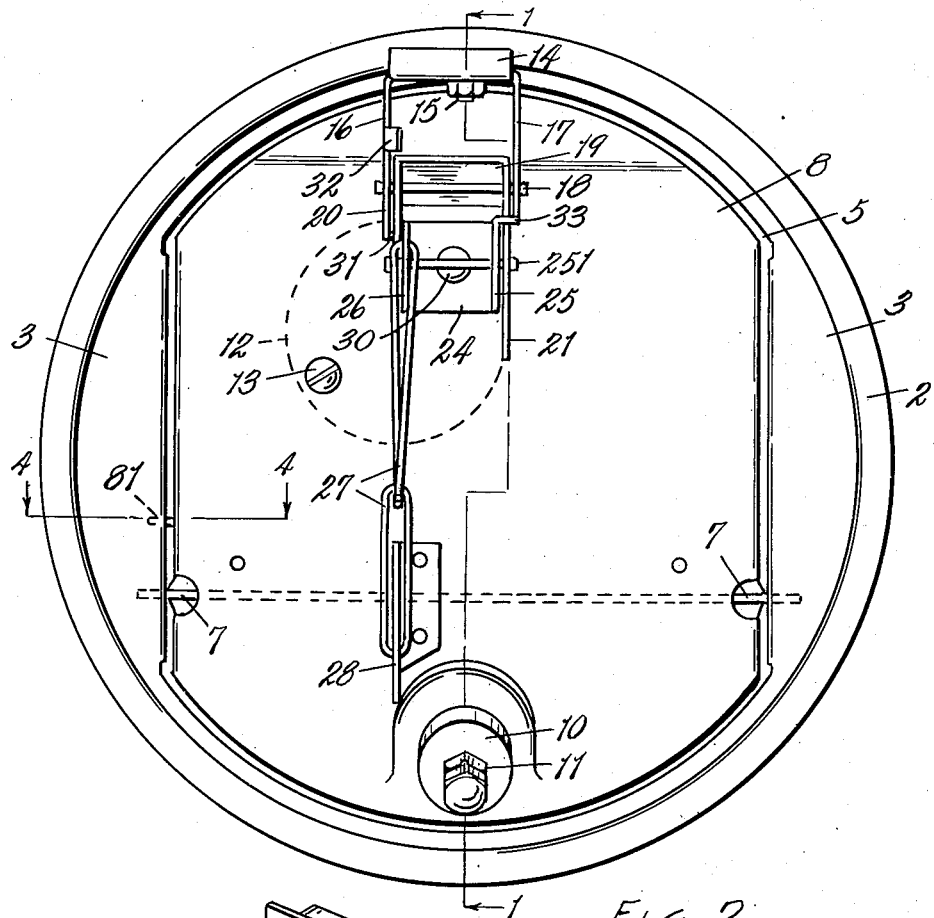
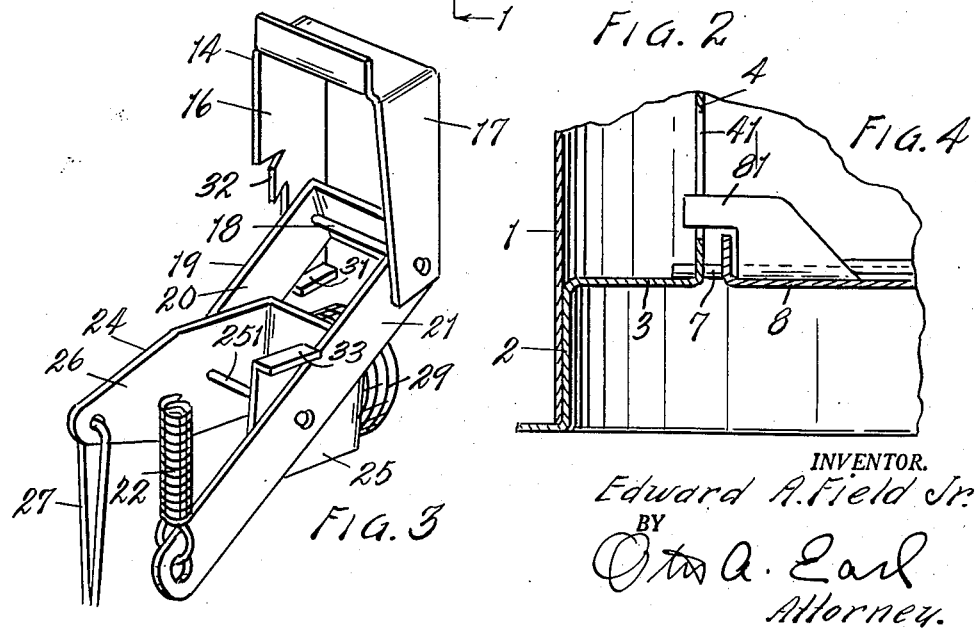
INVENTOR.
Edward A. Field Jr.
BY
Otto A. Earl
Attorney.

Jan. 8, 1952   E. A. FIELD, JR   2,581,757
DRAFT CONTROL
Filed July 28, 1949   3 Sheets-Sheet 3
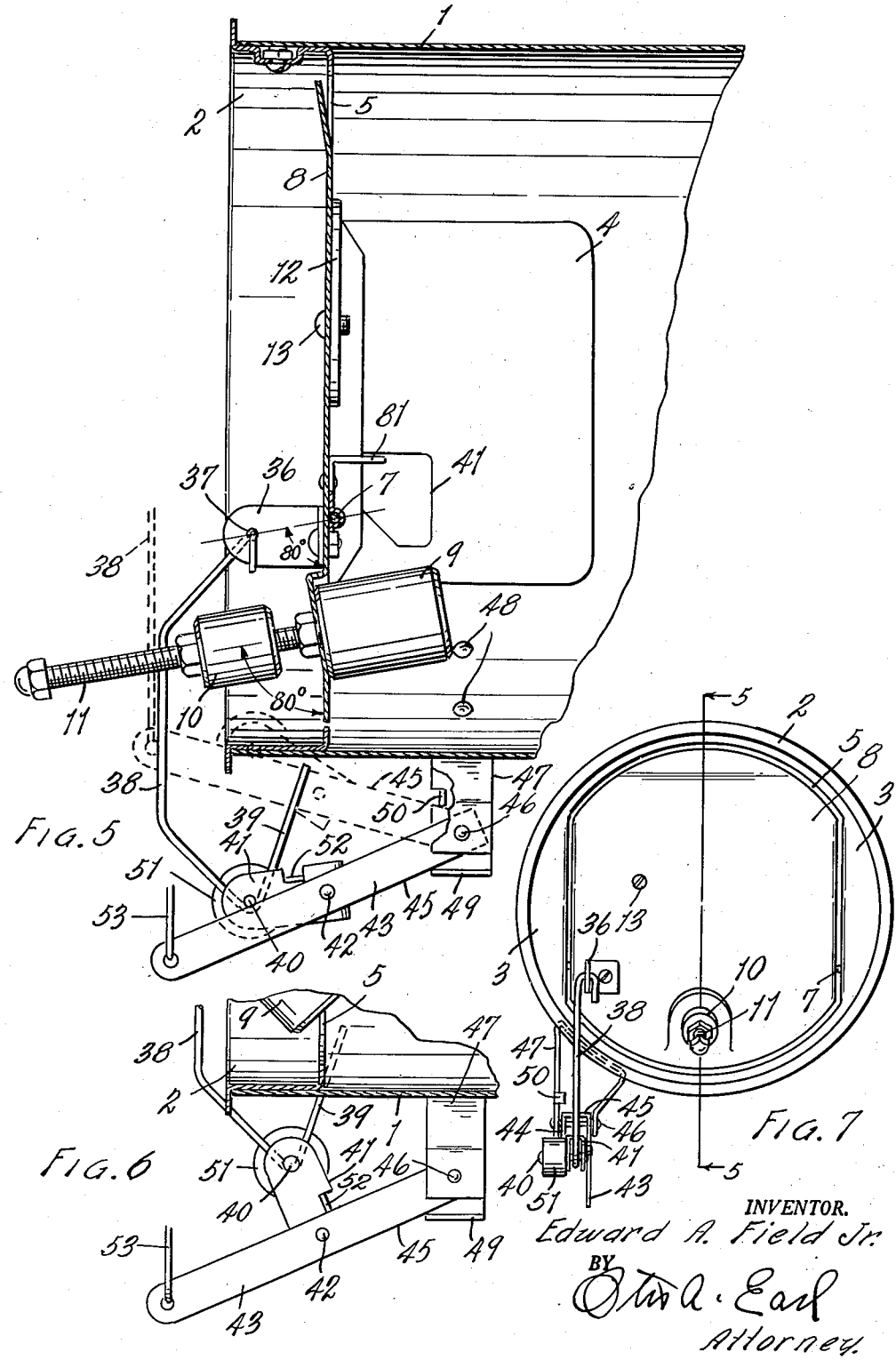
INVENTOR.
Edward A. Field Jr.
BY
Otis A. Earl
Attorney.

Patented Jan. 8, 1952

2,581,757

UNITED STATES PATENT OFFICE 2,581,757

DRAFT CONTROL

Edward A. Field, Jr., Mendota, Ill.

Application July 28, 1949, Serial No. 107,187

16 Claims. (Cl. 236—45)

This invention relates to improvements in draft controls.

The main objects of my invention are:

First, to provide a draft control which may be readily adjusted for maintaining either a high draft or a low draft.

Second, to provide a main draft control mechanism adapted to maintain a high draft, and an auxiliary draft mechanism adapted to be thrown into operation which in conjunction with said main draft control, is adapted to maintain a low draft.

Third, to provide a main draft control mechanism adapted to maintain a low draft and an auxiliary draft control mechanism adapted to be thrown into operation which in conjunction with the main draft control mechanism, is adapted to maintain a high draft.

Fourth, to provide a control of the type described which is simple in its parts, is readily adjusted, and very sensitive in operation.

Further objects relating to details and economies of my invention will appear from the description to follow. The invention is defined and pointed out in the claims.

Preferred embodiments of the invention are illustrated in the accompanying drawing, in which:

Fig. 2 is a front elevational view of the draft control.

Fig. 3 is a detailed perspective view of the auxiliary gate control, detached from the gate housing.

Fig. 4 is a fragmentary view on the line 4—4 of Figs. 1 and 2.

Fig. 5 is a central vertical sectional view on the line 5—5 of Fig. 7 illustrating a draft control in accordance with a second embodiment of my invention.

Fig. 6 is a detailed fragmentary view of a portion of the auxiliary control, illustrating the same in different operative position from that shown in Fig. 5.

Fig. 7 is a front elevational view of the embodiment of Fig. 5.

Figure 1:
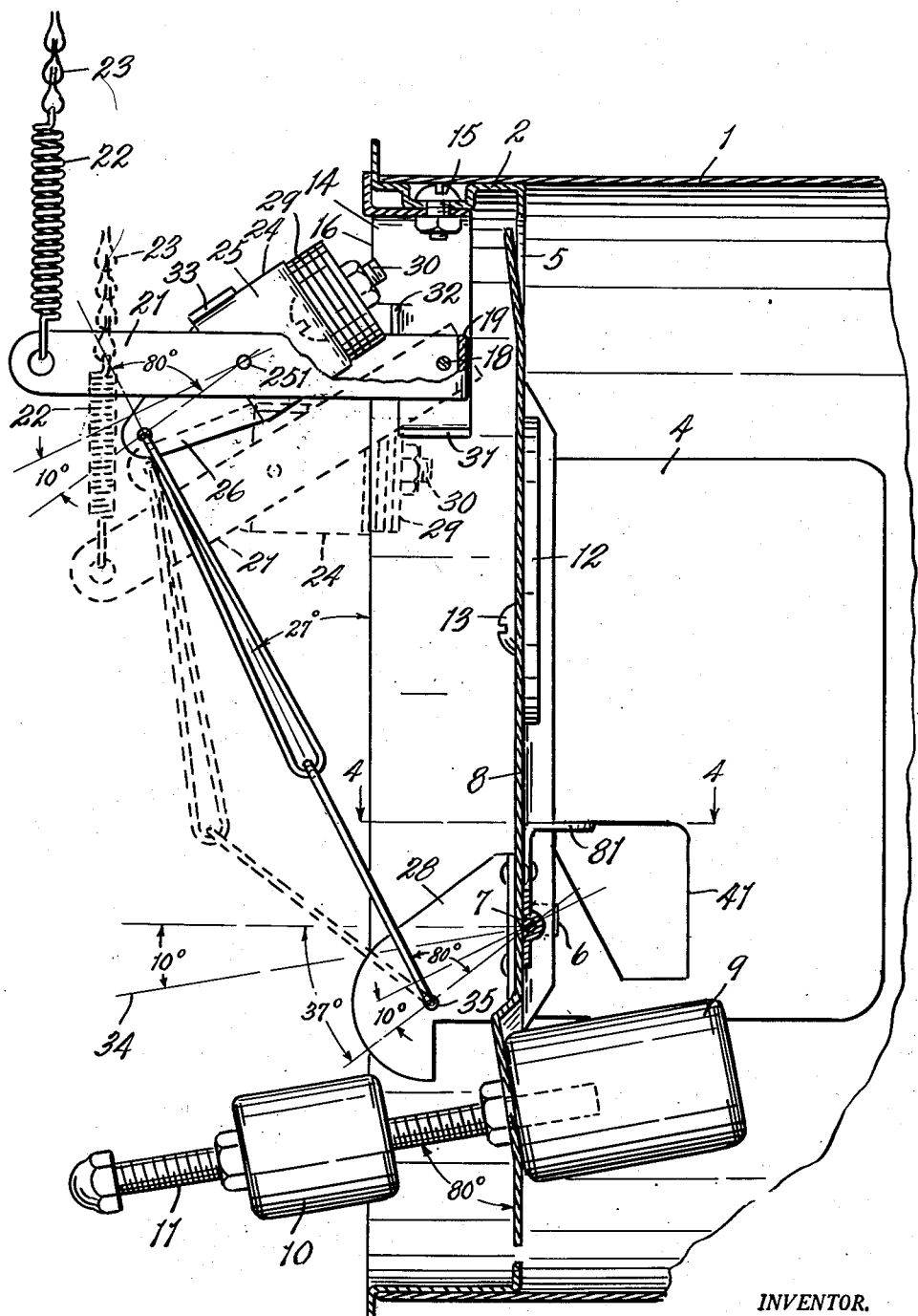
Fig. 1 is a central vertical sectional view on the line 1—1 of Fig. 2 illustrating a draft control in accordance with one embodiment of my invention.

Referring to the drawing and the embodiment of Figs. 1 to 4, the numeral 1 designates a housing member connected to a furnace flue not shown. In the outer open end of the housing member 1, a circular frame or stamping 2 is inserted, this frame having inwardly projecting side wings 3 provided with rearwardly projecting flanges 4 and defining a generally rectangular gateway or opening 5. Suitable openings 6 are provided in the rearwardly projecting flanges 4 for journaling a transverse trunnion or pivot rod 7, upon which the gate 8 is mounted. An ear 81 on the gate 8, engageable with upper and lower edges of the opening 41 in one of the flanges 4, limits outward and inward swinging movements of the gate.

The gate 8 is provided with a standard counterweight mechanism consisting of the back or rear weight 9 attached to the gate, and a further front weight 10. This front weight 10 is longitudinally adjustably carried by the threaded screw 11 which is secured to and extends forwardly of the gate at an angle of 80° therewith. The foregoing balancing mechanism exerts a predetermined counterbalancing action on the gate which is adjustable within certain limits by the adjustment of weight 10. A supplementary disklike weights 12 is adjustably secured by eccentrically disposed screw 13 to the back of the gate and above the pivot thereof. This weight is adjustable to accurately counterbalance the gate and it is not intended that this be adjusted for barometric control once the gate is properly balanced, desirably at the factory.

The foregoing balancing mechanism exerts a predetermined balancing action on the gate which is adjustable within certain limits by adjustment of the weight 10. With the arrangements described it is possible to adjust the main weight 10 to maintain a high draft which is sufficient for the high setting in most cases. In addition, the present invention contemplates the provision of an auxiliary draft control means which is brought into action when the fire is to be checked, and it can be so weighted that it will maintain a low draft.

This auxiliary control mechanism comprises a bracket 14 attached to the circular frame 2 by a bolt 15 as shown in Figs. 1 and 2. This bracket is provided with two spaced downwardly projecting arms 16 and 17, between which extends a pivot pin 18 on which is mounted a U-shaped lever 19 provided with arms 20 and 21. To one end of arm 21 a spring 22 and chain 23 are connected, the chain extending to a damper motor not shown or to some convenient place if draft is manipulated by hand. A second U-shaped lever 24 is mounted on the pivot pin 25I for swinging movement between the arms 20 and 21 of the lever 19. The lever 24 is provided with two arms 25 and 26, the arm 26 being connected by the two links 27 to the arm or bracket 28 projecting outwardly from the gate 8 and fixedly secured thereto.

A weight 29 is attached to the inner end of the lever 24, this weight consisting of metal washers secured by a bolt 30 to the lever. When the chain 23 is lowered, a stop 31 on the lower end of the arm 16 of bracket 14 engaging with the arm 20 of lever 19, as shown in Fig. 3, limits downward movement of the lever 19, as shown in Figs. 1 and 3. When the chain 23 is pulled upwardly, an ear 32 on the arm 16 of the bracket 14 engaging with the arm 20 of the lever 19, limits upward swinging movement of the lever. When the arm 21 is pulled upwardly, an outwardly bent ear 33 on the arm 25 of the lever 24 engages with the arm 21 of the lever 19 to limit upward swinging movement of the weighted end of the lever 24, as shown in Fig. 1. When the arm 21 is lowered, the ear 33 engages with the arm 21 to limit downward swinging movement of the weighted end of the lever 24, as shown in Fig. 3.

In operation, when heat is required, the chain 23 is lowered which allows the lever 19 and links 27 to drop to dotted line position of Fig. 1 and the full line position of Fig. 3. In this position the ear 33 of the lever 24 engages the arm 21 to prevent further downward movement of the weight 29, resulting in the links 27 hanging loosely, and since these links are light in weight they have no appreciable effect upon the operation of the draft control gate. In this position the main adjustment weights 9 and 10 produce such turning torque on the gate 8 as to maintain sufficient draft to provide a good response when there is a call for heat. When the need for heat is satisfied, the chin 23 is raised, thus raising the arm 21, weighted lever 24 and links 27 to the full line position shown in Fig. 1. In this position the linkage 27 is drawn tight, whereby the weight 29 on the lever 24 produces a turning torque on the gate 8 which tends to open the gate opposite to the torque produced by the main weight 10 which tends to close the gate. In other words, when the weight 29 is in the full line position of Fig. 1, its turning torque on the gate subtracts from that of the weight 10.

With the arrangements described it is possible to adjust the main weight 10 to maintain .06" draft control which is sufficient for the high setting in most cases. When the fire is to be checked, the auxiliary mechanism can be brought into action and it can be so weighted that it will substract .04" of draft and in this way the control will maintain .02" of draft. The above combination of draft settings is merely illustrative, other suitable combination can be maintained.

It is important that the auxiliary mechanism above described should increase or decrease the closing torque in the correct manner. The control is so designed that the center of gravity of the gate assembly shifts in a plane indicated by line 34 that passes through the pivot 7 of the gate. This plane of adjustment extends at an angle of 80° to the face of the gate, inclining outward and downward. The moment arm varies, increasing for the first 10° of gate opening and then diminishing thereafter. Therefore, what might be termed negative torque produced by the auxiliary control mechanism should vary with different gate positions in the same manner that the closing torque applied to the gate changes. This has been accomplished by locating the point 35 where the linkage 27 attaches to the bracket 28 on the gate at the correct angle with respect to the pivot 7. The force or pull exerted by the wire linkage 27 will be less when the gate 8 is wide open, since the moment arm will have shortened. While the force of gravity acts in a vertical direction and the counterweight mechanism on the gate had to be designed with this in view, it was not convenient to have the wire links 27 extend straight upward. The links 27, when tight in the full line position of Fig. 1, extend outward at an angle of 27° to the vertical. The radius of the arc of movement of the upper end of the linkage 27 is substantially equal to the radius of the arc movement of the lower end of the linkage and when the arm 21 is adjusted to the full line position of Fig. 1 to increase the furnace draft, the upper radius is substantially parallel to the lower radius, so that even when the gate opens this pull is still essentially 27° to the vertical. This is important for if the direction were to change radically, the results would not be as desired. Also to provide the desired pull on the linkage at all times, the point of attachment of the linkage to the lever 24, the pivot of this lever, and the center of gravity of the weight 29 all lie in a common plane. As shown in Fig. 1 in full lines the weight supporting arm 25 and the weight 29 are above the horizontal position when the gate 8 is closed. The arm and weight move downwardly to a horizontal position during the forepart of the opening movement of the gate and move downwardly from a horizontal position during the later part of the opening movement. As a result the upward pull on the linkage 27 and opening torque on the gate produced by the weight 29 is increased during the forepart of the opening movement on the gate and decreased during later part of the opening engagement. The arrangement is such that as the main weight mechanism increases the closing torque on the gate through the first 10° of the opening of the gate and thereafter decreases the closing torque on the gate throughout the remainder of opening of the gate, the auxiliary mechanism increases the opening torque on the gate through the fore part of the opening of the gate and thereafter decreases the opening torque on the gate during the remainder of the opening movement of the gate. 10° above referred to is preferable for a 9" control. Due to variation in proportions the angle may be varied. For example, with a 20" inch control the angle may be 20°.

In the embodiment of the invention shown in Figs. 5, 6 and 7, the auxiliary draft control is disposed below the main draft control and the opening torque on the gate is increased on the gate when there is need for heat. The auxiliary control mechanism is rendered inoperative when the fire is to be checked instead of being rendered operative as in the embodiment of Figs. 1 to 4. The gate structure and main adjustment weights 9 and 10 are essentially the same as in the embodiment previously described. The auxiliary control structure comprises an arm or bracket 36 fixedly connected to the gate 8 and projecting outwardly therefrom. In the outer end of this bracket is a hole 37 disposed in a plane coinciding with the pivot 7 of the gate and extending downward at an angle of 80° with the face of the gate. This plane is the same plane in which lies the center of gravity of the complete gate assembly, and when the main adjustment weight is shifted from one position to another the center of gravity moves towards or away from the hinge pin center line. A wire link 38 is hooked into the hole 37 of the arm 36. This link is bowed outwardly so that it will clear the ring frame 2 of the draft control and still permit its lower end to swing beneath the ring. The lower end of the link is bent to provide a hook 39 disposed to releasably engage a pin or rivet 40 extending between the outer ends of the arms of a U-shaped lever 41, pivoted at 42 at its inner end between the arms 43 and 44 of a second U-shaped lever 45. This lever 45 is pivoted at 46 between the arms of a U-shaped bracket 47 which is fixedly attached by means of rivets 48 to the housing 1 at one side of the bottom central portion thereof.

The bracket 47 is provided with laterally bent ears 49 and 50, the ear 49 being disposed to limit downward swinging movement of the lever 45 and the ear 50 being disposed to limit upward swinging movement of said lever. A weight 51 is mounted on the pin 40 and at the outer side of one of the arms of the lever 41. An outwardly bent ear 52 on the lever 41 is disposed to engage the arm 43 of lever 45 to limit downward swinging movement of lever 41 under the influence of the weight 51. A flexible connection means 53 connected to the lever 45 is either manually or automatically operable to lower the lever 45 into engagement with the stop 49 as shown in Figs. 5 and 6, in which position the hook 39 of link 38 engages the pin 40 of the weighted lever 41 so that the weight 51 is supported by the link 38 to increase the closing torque on the gate 8. When the lever 45 is pulled upwardly into the dotted line position of Fig. 5, the pin 40 is disengaged from the hook 39 and the weight 51 is no longer supported by the link 38 and the turning torque on the gate is decreased. When the lever 45 engages the stop 49 as shown in Fig. 5, a line connecting pivot 42 and pin 40 is disposed approximately parallel to the axis of the screw 11 and parallel to the line connection pivot pin 7 and opening 37. This line extends downwardly and is disposed at an angle of approximately 80° to the plane of the gate. This facilitates proper turning torque on the gate for all positions of the gate.

In operation, the embodiment of Figs. 5, 6 and 7 differs from the embodiment of Figs. 1 to 4 in that the main weight of the draft control is adjusted to provide the low draft setting. Then when a stronger draft is required the flexible connecting means 53 is lowered until the lever 45 engages stop 49. The hook 39 of the link 38 then engages the pin 40, lifting the lever 41 and weight 51 carried thereby so that the ear 52 no longer engages the arm 43 of the lever 45. The closing torque on the gate is thus increased by the weight of the auxiliary weight 51 to maintain a high draft. As the main weight mechanism increases the closing torque on the gate through the first 10° or other number of degrees of opening movement of the gate and thereafter decreases the closing torque during the remainder of the opening movement, so also does the auxiliary control mechanism increase the closing torque on the gate during a corresponding number of degrees of opening movement and thereafter decrease the turning torque during the remainder of the opening movement.

I have illustrated and described my invention in embodiments which I have found very practical. I have not attempted to illustrate or describe other embodiments or adaptation as it is believed this disclosure will enable those skilled in the art to embody or adapt my invention as may be desired.

Having thus described the invention what I claim as new and desire to secure by Letters Patent is:

1. In a draft regulator device, an open ended housing, a control gate in the outer open end of the housing, said gate being vertically disposed when closed, and being horizontally pivoted for inward swinging movement of the upper portion thereof by excess pressure on the outer surface thereof, a main weight on the gate beneath the pivot thereof for producing a closing torque on the gate, an auxiliary weight for producing an opening torque on the gate less than the closing torque of the main weight, means for rendering said auxiliary weight either operative or inoperative to produce an opening torque on the gate, said means including a first lever and a second lever, said first lever being pivotally supported intermediate its ends on said second lever, a weight supported by one end of the first lever intermediate the pivot thereof and the gate, means for adjustably raising and lowering the second lever about the pivot thereof, a first stop engageable with said second lever for limiting upward movement thereof, a second stop engageable with said second lever for limiting downward movement thereof, a bracket projecting outwardly from said gate, links connecting said bracket to the end of the first lever on the side of the pivot thereof opposite from the auxiliary weight, a stop on the first lever engageable with the second lever for limiting downward swinging movement of the auxiliary weight when the said second lever is lowered into engagement with said second stop whereby the auxiliary weight is rendered inoperative to produce an opening torque on the gate, said stop on the first lever being raised from the second lever and the links tightened when the second lever is adjustably raised into engagement with said first stop whereby the auxiliary weight is operative to produce an opening torque on the gate.

2. In a draft regulator device, comprising an open ended control housing, a control gate adjacent the outer end of the housing, said gate being vertically disposed when closed and being horizontally pivoted for inward swinging movement of the upper portion thereof by excess pressure on the outer surface thereof, a main counterweight on the gate disposed beneath the pivot thereof for producing closing torque on the same, an auxiliary weight, a first lever on one end of which said auxiliary weight is supported, a second lever fixedly pivoted at one end, said first lever intermediate the ends thereof being pivotally supported by said second lever, means for raising and lowering the second lever, a bracket projecting outwardly from said gate, links connecting said bracket to the end of the first lever opposite the end thereof supporting said auxiliary weight, said auxiliary weight operating through said first lever, links and bracket to produce an opening torque on the gate when the second lever is raised.

3. In a draft regulating device, an open ended housing, a control gate in said housing, said gate being vertically disposed when closed and being horizontally pivoted for inward movement of a portion thereof above the pivotal axis of the gate by excess pressure on the outer surface thereof, a main weight for producing a closing torque on the gate, an auxiliary weight, means for connecting said auxiliary weight to the gate for producing an opening torque on the gate less than closing torque of the main weight, said means being adjustable to render the auxiliary weight inoperative to produce an opening torque on the gate, said means including a lever supporting said auxiliary weight, connecting means between said lever and said gate, adjustable means to which said lever is pivoted for bodily raising and lowering said lever, means on said lever engageable with said adjustable means for limiting downward swinging movement of said lever and the weight carried thereby relative to said adjustable means when said adjustable means is in lowered position, whereby the auxiliary weight is inoperative in producing an opening torque on the gate.

4. In a draft regulating device, an open ended housing, a control gate in said housing pivotally mounted for inward movement of a portion thereof by excess pressure on the outer surface of the gate, the pivotal axis of the gate being substantially horizontal and the gate opening inwardly above the pivotal axis thereof, a main weight for producing a closing torque on the gate, an auxiliary weight, means for connecting said auxiliary weight to the gate for producing an opening torque on the gate, said means being adjustable to render the auxiliary weight inoperative in producing an opening torque on the gate, said means including a lever for supporting said auxiliary weight for downward swinging movement thereof, means for connecting said lever to said gate, said lever being disposed above the pivotal axis of the gate, said connecting means and auxiliary weight being connected to said lever on the opposite sides of the pivotal axis thereof, and a stop for limiting downward swinging movement of the lever and the weight supported thereby, whereby the auxiliary weight is inoperative to produce an opening torque on the gate.

5. In a draft regulating device, an open ended housing, a control gate in said housing pivotally mounted for inward swinging movement thereof by excess pressure on the outer surface of the gate, a main weight for producing a closing torque on the gate, an auxiliary weight, means for connecting said auxiliary weight to the gate for producing an opening torque on the gate, and for rendering said auxiliary weight inoperative in producing an opening torque on the gate, said means including a first member vertically adjustable, a second member mounted on and vertically movable relative to said first member and supporting said auxiliary weight and connected to said gate, and means on said first and second members for limiting downward movement of said second member and the weight supported thereby relative to said first member when the first member is in a lowered position.

6. In a draft regulating device, an open ended housing, a control gate in said housing pivotally mounted for inward swinging movement thereof by excess pressure on the outer surface of the gate, a main weight for producing a closing torque on the gate, an auxiliary weight, means for connecting said auxiliary weight to the gate for producing an opening torque on the gate, said means including adjustable means to render said auxiliary weight inoperative in producing an opening torque on the gate, said main weight being disposed relative to the gate to increase its closing torque on the gate during the first portion of the opening movement of the gate and to decrease its closing torque during the latter portion of the opening movement, said auxiliary weight and the means for connecting the same to the gate being disposed relative to the gate to increase the opening torque on the gate during the first portion of the opening movement of the gate and to decrease the opening torque during the latter portion of the opening movement.

7. In a draft regulating device, an open ended housing, a control gate in said housing pivotally mounted for inward movement thereof by excess pressure on the outer surface of the gate, a main weight for producing a closing torque on the gate, an auxiliary weight disposed forwardly of the vertical plane of the gate, a lever mounted for vertical swinging movement on said housing, an arm pivotally connected to said lever for vertical swinging movement relative thereto, said arm being connected to said gate and said auxiliary weight being supported on said arm for producing a turning torque on said gate, and means connected to said lever for adjusting the vertical position of the same for rendering said auxiliary weight inoperative in producing a turning torque on the gate.

8. In a draft regulating device, an open ended housing, a control gate in said housing pivotally mounted for inward movement thereof by excess pressure on the outer surface of the gate, a main weight for producing a closing torque on the gate, an auxiliary weight, a lever mounted for vertical swinging movement on said housing, an arm pivotally connected to said lever for vertical swinging movement relative thereto, said arm being connected to said gate and said auxiliary weight being supported on said arm for producing a turning torque on said gate, and means connected to said lever for adjusting the vertical position of the same for rendering said auxiliary weight inoperative in producing a turning torque on the gate.

9. In a draft regulating device, an open ended housing, a control gate in said housing horizontally pivotally mounted for inward movement thereof by excess pressure on the outer surface thereof, a main weight for producing a closing torque on the gate, said main weight being disposed relative to the gate to slightly increase its closing torque on the gate during the first portion of the opening movement on the gate and to thereafter gradually decrease its closing torque on the gate during the remainder of the opening movement of the gate, an auxiliary weight connected to the gate for producing an opening torque on the gate, means for connecting the auxiliary weight to the gate for increasing the opening torque on the gate as the main weight increases the closing torque and to thereafter decrease the opening torque on the gate as the main weight decreases the closing torque on the gate, and adjustable means for rendering the auxiliary weight inoperative to produce an opening torque on the gate.

10. In a draft regulating device, an open ended housing, a control gate in said housing horizontally pivotally mounted for inward movement of a portion thereof by excess pressure on the outer surface thereof, a main weight for producing a closing torque on the gate, said main weight being disposed relative to the gate to slightly increase its closing torque on the gate during the first portion of the opening movement on the gate and to thereafter gradually decrease its closing torque on the gate during the remainder of the opening movement of the gate, an auxiliary weight connected to the gate for producing a turning torque on the gate, means for connecting the auxiliary weight to the gate for increasing the turning torque on the gate as the main weight increases the closing torque and to thereafter decrease the turning torque on the gate as the main weight decreases the closing torque on the gate, and adjustable means for rendering the auxiliary weight inoperative to produce a turning torque on the gate.

11. In a draft regulating device, an open ended housing, a control gate in said housing pivotally mounted for inward movement of a portion thereof by excess pressure on the outer surface thereof, a main control means for producing a closing torque on the gate, an auxiliary control means for producing a turning torque on the gate, said main control means being disposed relative to the gate to decrease the closing torque on the gate during the latter portion of the opening movement of the gate, said auxiliary control means being disposed relative to the gate to decrease its turning torque on the gate during the latter portion of the opening movement of the gate, and adjustable means for rendering said auxiliary control means inoperative to produce full turning torque on the gate.

12. In a draft regulating device, an open ended housing, a control gate in said housing pivotally mounted for inward movement of the gate by excess pressure on the outer surface thereof, a main control means for producing a closing torque on the gate, an auxiliary control means for producing an opening torque on the gate, and means including an adjustable member for rendering said auxiliary control means inoperative to produce an opening torque on the gate said main control means being disposed relative to the gate to increase its opening torque on the gate during the first portion of the opening movement of the gate and to decrease its closing torque during the latter portion of the opening movement, said auxiliary control means being disposed relative to the gate to increase its opening torque on the gate during the first portion of the opening movement and to decrease its opening torque during the latter portion of the opening movement.

13. In a draft regulating device, an open ended housing, a control gate in said housing pivotally mounted for inward movement of the gate by excess pressure on the outer surface thereof, a main control means for producing a closing torque on the gate, an auxiliary control means for producing a turning torque on the gate, said auxiliary control means including a weight, a lever mounted for vertical swinging movement on said housing, an arm pivotally connected to said lever for vertical swinging movement relative thereto, said arm being connected to said gate and said weight being supported on said arm for producing a turning torque on the gate, and means connected to said lever for adjusting the vertical position thereof to render said weight inoperative in producing a turning torque on the gate.

14. In a draft regulating device, an open ended housing, a control gate in said housing pivotally mounted for inward movement of the gate by excess pressure on the outer surface thereof, a main control means for producing a closing torque on the gate, an auxiliary control means for producing a closing torque on the gate and means including an adjustable member for rendering the auxiliary control means inoperative to produce a closing torque on the gate, said main control means being disposed relative to the gate to decrease the closing torque on the gate during the latter portion of the opening movement of the gate, said auxiliary control means being disposed relative to the gate to decrease its closing torque on the gate during the latter portion of the opening movement of the gate.

15. In a draft regulating device, an open ended housing, a control gate in said housing pivotally mounted for inward swinging movement of said gate by excess pressure on the outer surface thereof, a main weight connected to said gate for producing a closing torque on the same, an auxiliary control mechanism for producing a closing torque on the gate comprising a bracket secured to and projecting outwardly from the gate, a link pivoted to and depending from said bracket and having an upwardly opening hook at its ower end, a lever, an arm pivotally supported by said lever, an auxiliary weight carried by said arm, a laterally projecting member on said arm disposed to be engaged within said hook, means between said arm and lever for limiting downward swinging movement of the arm and auxiliary weight relative to said lever, and means connected to said lever for raising and lowering the same together with said arm and auxiliary weight, the hook of said link being disposed to engage said laterally projecting member of the arm to support the auxiliary weight when said lever is lowered to produce a closing torque on the gate, the laterally projecting member of the arm being disengaged from the hook when said lever is raised to render the auxiliary weight inoperative in producing a closing torque on the gate, said main weight being disposed relative to the gate to decrease the closing torque on the gate during the latter portion of the opening movement of the gate, said auxiliary mechanism being disposed relative to the gate to decrease its closing torque on the gate during the latter portion of the opening movement of the gate.

16. In a draft regulating device, an open ended housing, a control gate in said housing pivotally mounted for inwardly swinging movement of the gate by excess pressure on the outer surface thereof, a main weight connected to said gate for producing a closing torque on said gate, an auxiliary weight, means connected to said gate and supporting said auxiliary weight to produce a closing torque on the gate, and adjustable means operable to support said auxiliary weight to render the auxiliary weight inoperative in producing a closing torque on the gate, said main weight being disposed relative to the gate to decrease its closing torque on the gate during the latter portion of the opening movement of the gate, said auxiliary weight and connecting and supporting means therefor being disposed relative to the gate to decrease the closing torque of the auxiliary weight on the gate during the latter portion of the opening movement of the gate.

EDWARD A. FIELD, JR.

REFERENCES CITED

The following references are of record in the file of this patent:

UNITED STATES PATENTS

| Number | Name | Date |
| --- | --- | --- |
| 1,211,501 | Goodhart | Aug. 13, 1940 |
| 2,241,590 | Field | May 13, 1941 |
| 2,253,290 | Field, Jr. | Aug. 19, 1941 |
| 2,282,125 | Firehammer | May 5, 1942 |
| 2,371,512 | Field | Mar. 13, 1945 |